US006333797B1

(12) United States Patent
Katsuta et al.

(10) Patent No.: US 6,333,797 B1
(45) Date of Patent: Dec. 25, 2001

(54) DOCUMENT FEEDER AND METHOD OF DOCUMENT READING

(75) Inventors: Kunihiko Katsuta, deceased, late of Komaki, by Shikou Katsuta, Hiroko Katsuta, legal representatives; Akiyoshi Johdai, Toyokawa; Tohru Murakami, Okazaki; Hirofumi Tanahashi, Toyohashi, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/128,647

(22) Filed: Aug. 4, 1998

(30) Foreign Application Priority Data

Aug. 8, 1997 (JP) .................................................. 9-215354

(51) Int. Cl.$^7$ ...................................................... H04N 1/04
(52) U.S. Cl. .......................... 358/498; 399/396; 271/270
(58) Field of Search ................................ 399/367, 361, 399/372, 211, 396; 358/498, 496, 474, 476, 488; 271/270, 259

(56) References Cited

U.S. PATENT DOCUMENTS

| 5,461,468 | * | 10/1995 | Dempsey et al. ................ 355/316 |
| 5,575,466 | * | 11/1996 | Tranquilla ........................ 271/10.03 |
| 5,666,609 | * | 9/1997 | Aoki .................................. 399/183 |
| 5,687,010 | * | 11/1997 | Van Tilborg ...................... 358/496 |
| 5,692,742 | * | 12/1997 | Tranquilla ........................ 271/10.03 |
| 5,755,435 | * | 5/1998 | Fujiwara .......................... 271/4.04 |
| 5,848,784 | * | 12/1998 | Tranquilla ........................ 271/10.03 |
| 5,903,811 | * | 5/1999 | Kobayashi et al. ............... 399/367 |
| 6,005,687 | * | 12/1999 | Kawashima et al. ............. 358/498 |

* cited by examiner

Primary Examiner—Cheukfan Lee
(74) Attorney, Agent, or Firm—Burns, Doane, Swecker & Mathis, LLP

(57) ABSTRACT

A document feeder which picks up documents from a tray, separates/feeds a document with a feed roller and a separation roller and transports the document on a reading position with read rollers. The speed of feeding a document by the feed roller is higher than the speed of transporting a document by the read rollers. The reading position is at a distance from the nip portion between the feed roller and the separation roller, the distance being longer than the length in the document feeding direction of the document.

19 Claims, 12 Drawing Sheets

F I G. 1
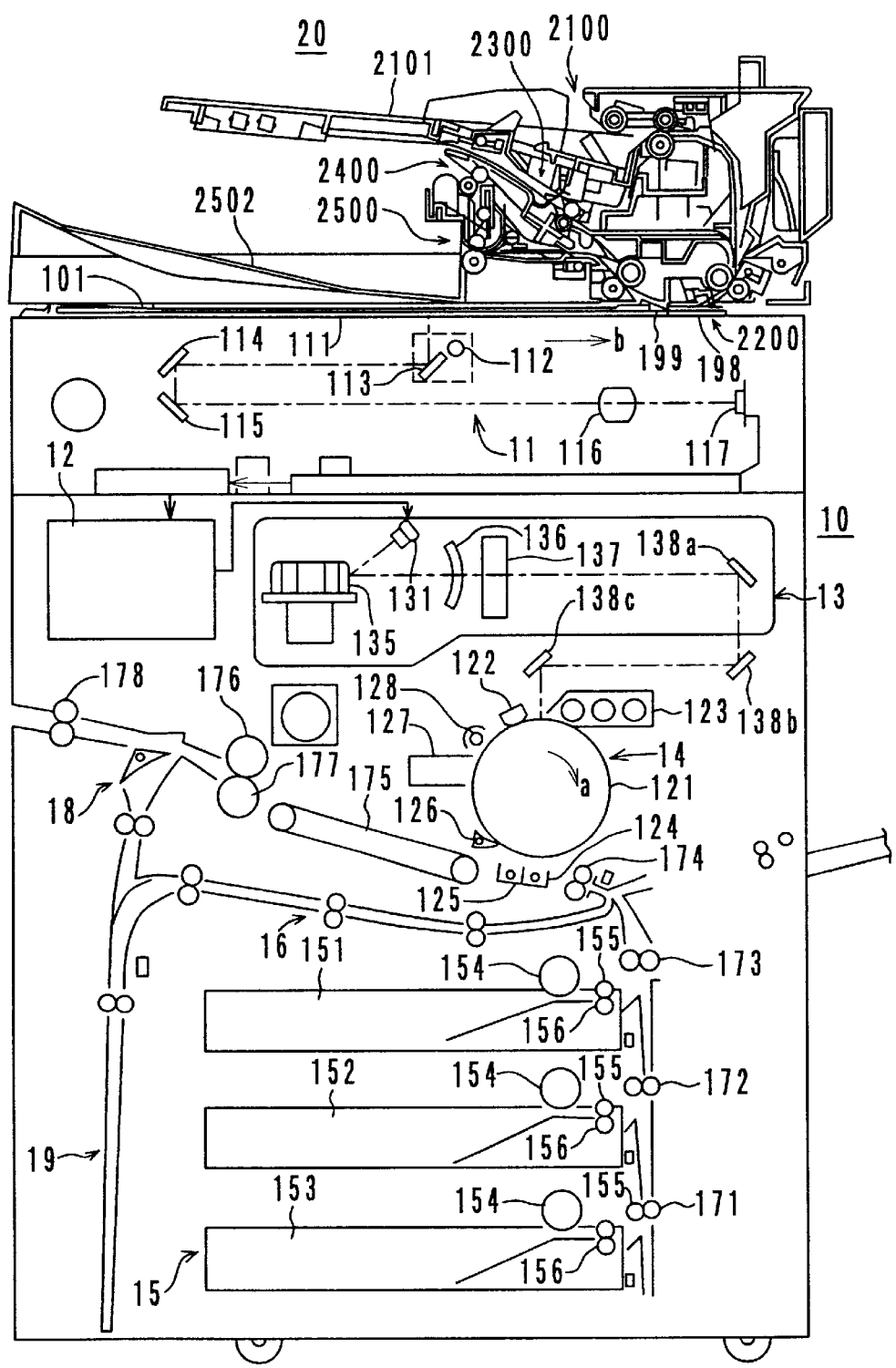

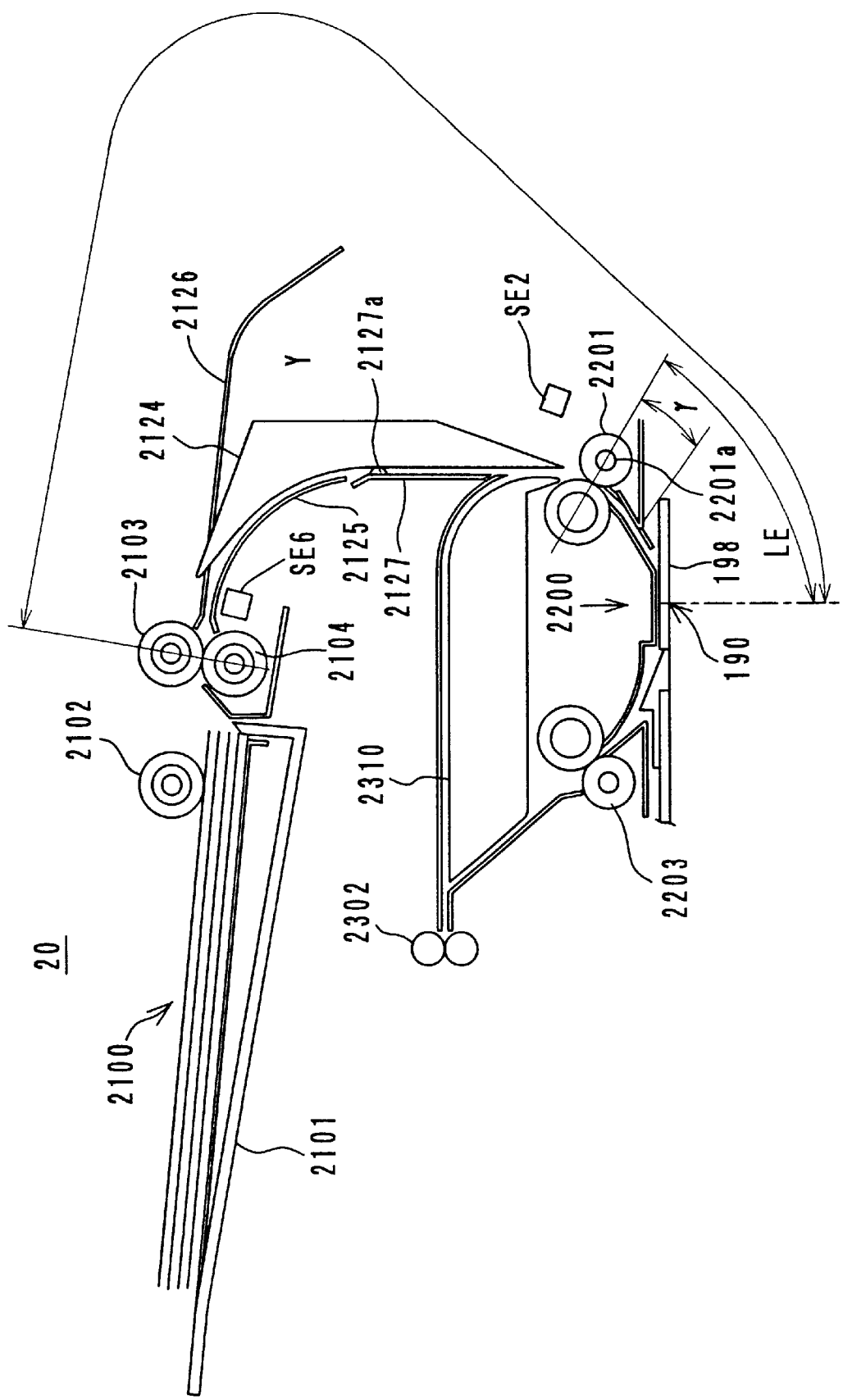

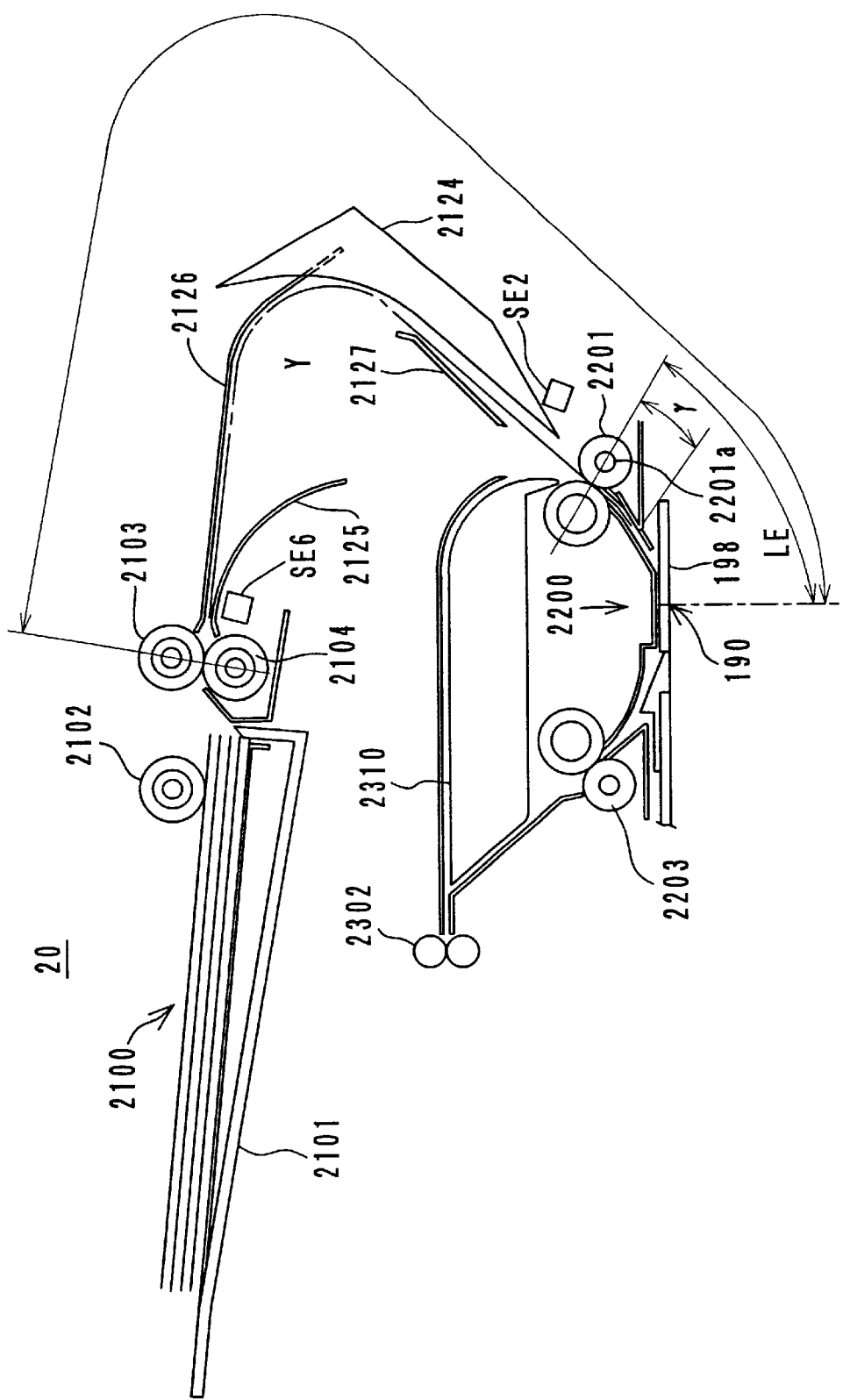

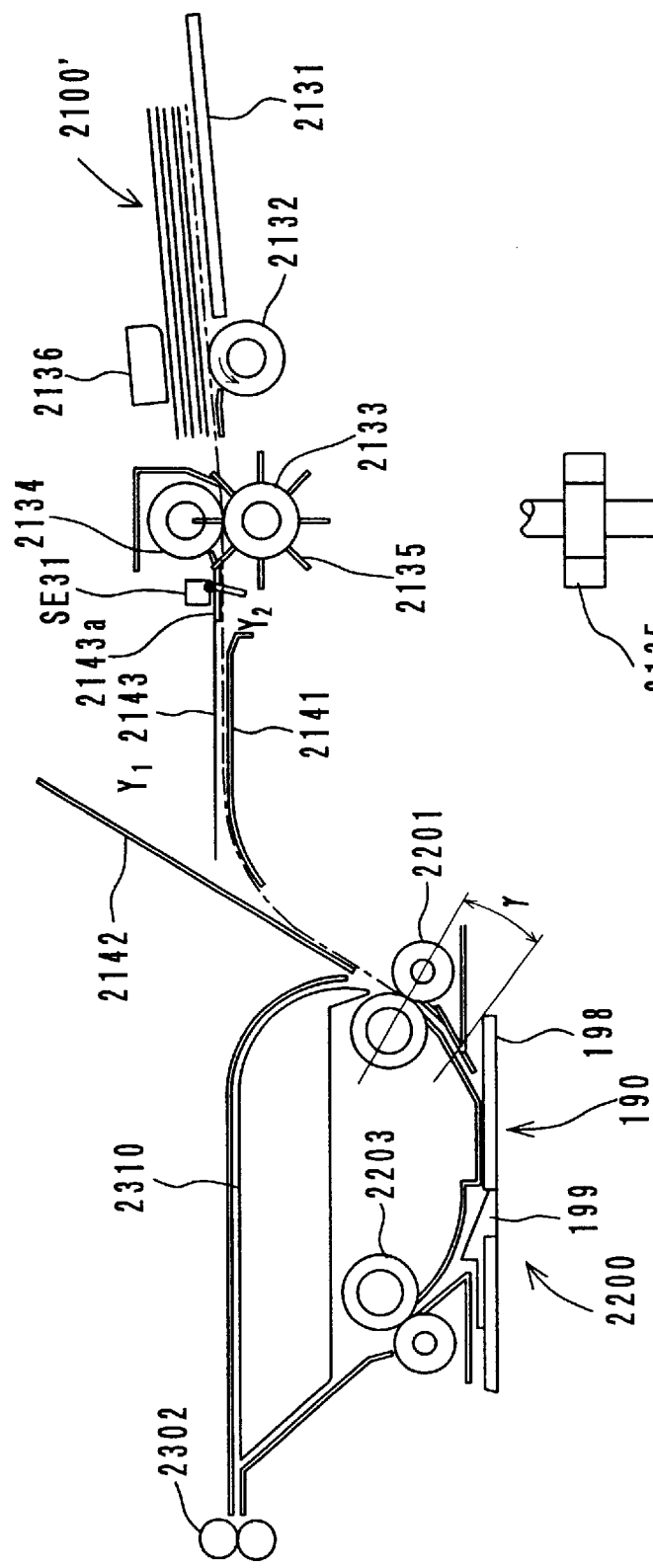
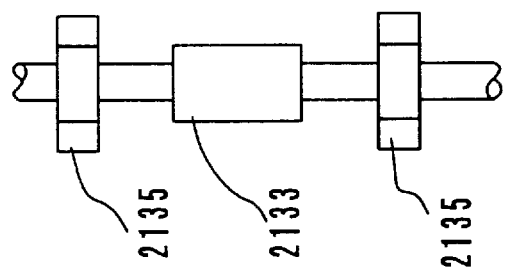
FIG. 10a
FIG. 10b

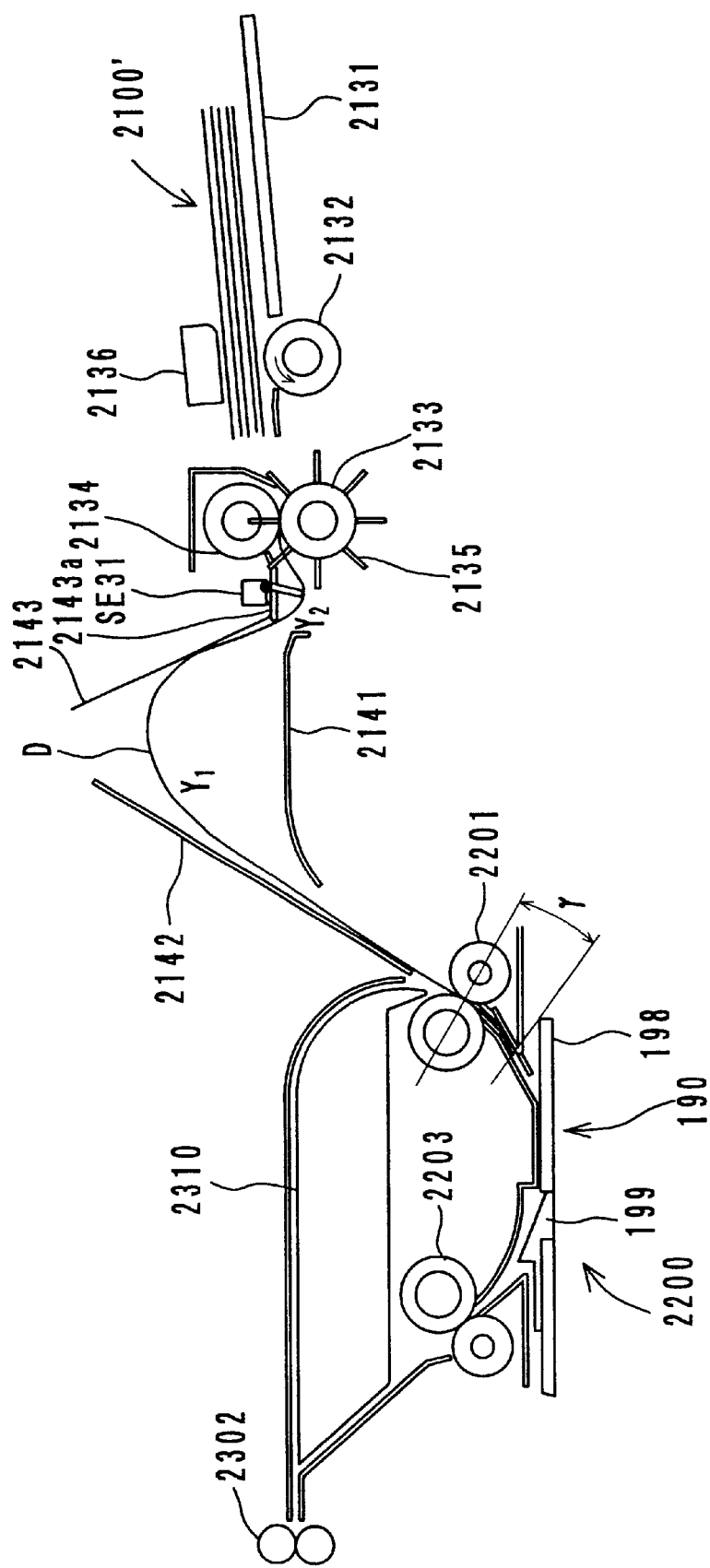

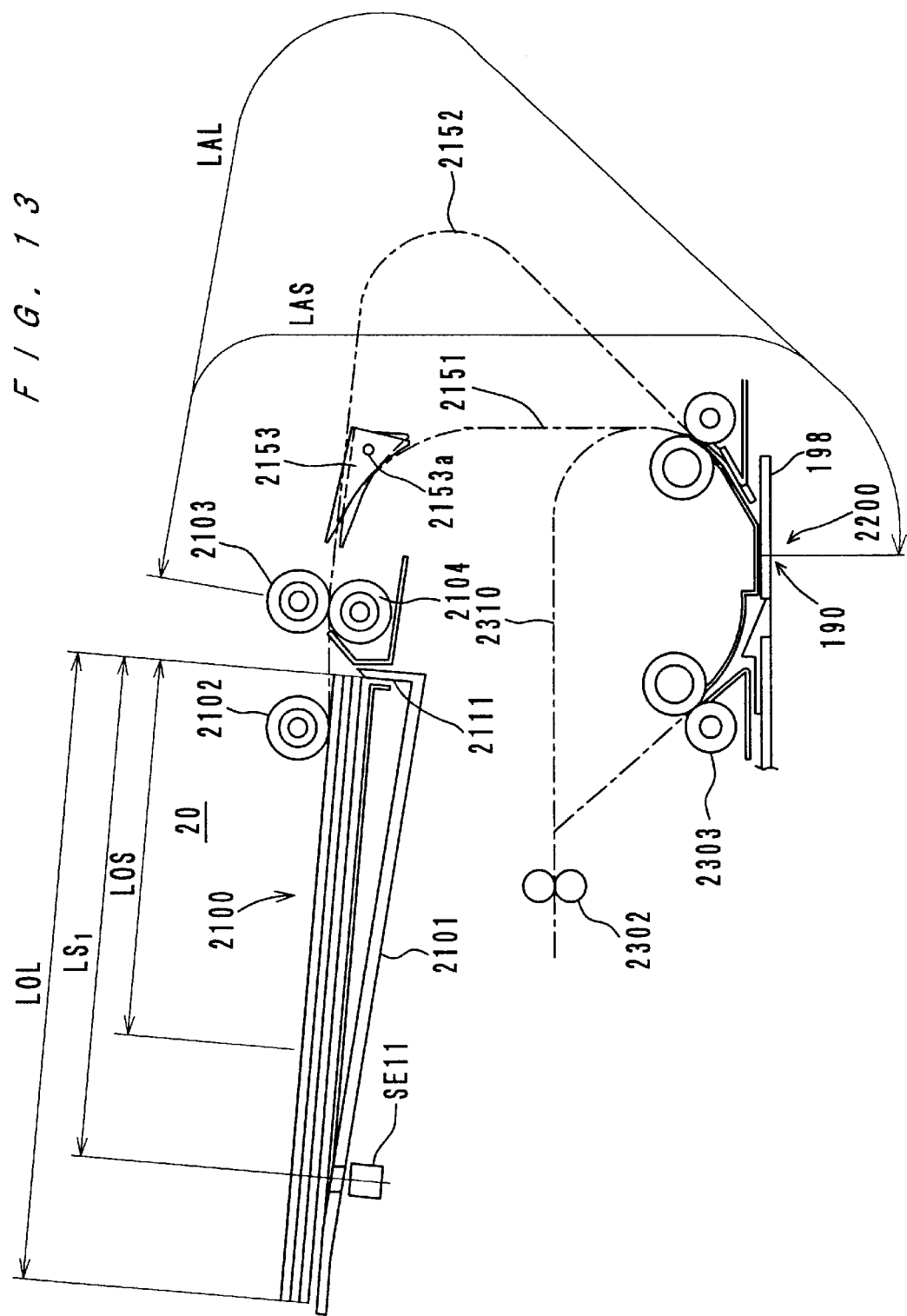

DOCUMENT FEEDER AND METHOD OF DOCUMENT READING

This application is based on application No. 9-215354 filed in Japan, the contents of which are hereby incorporated by reference.

BACKGROUND OF THE INVENTION

1. Field of the Invention

The present invention relates to a document feeder, and a method of document reading and more particularly to a document feeder which picks up stacked documents one by one and feeds each document on an image reading position over a stationary image reading device at a constant speed.

2. Description of Related Art

Recently, various types of document feeders adopting a method in which the image of a document separated from a stack and fed to a reading position is read by a scanner, namely, a document-feeding image reading method have been provided. In such a document feeder, generally, separating/feeding means (rollers) is so structured to rotate following a document which is transported by transport means which is located downstream. Accordingly, when the trailing edge of the document passes the separating/feeding means, the load on the transport means changes, which changes the transport speed, thereby resulting in noise in the read image.

In order to solve this problem, conventionally, either of the following measures have been taken: a document is fed over the reading position once so that the trailing edge of the document certainly passes the separating/feeding means, and thereafter, the document makes a switchback and while being fed on the reading position again, the image is read; and the pressure for separating documents in the separating/feeding means is set low so that a change in load which occurs when the trailing edge of a document passes the separating/feeding means will be small.

However, in the former, because image reading is carried out after a switchback of a document, the copying productivity is low. In the latter, because the separating pressure is low, it is likely that a plurality of documents are fed at a time.

SUMMARY OF THE INVENTION

It is an object of the present invention to provide a document feeder and a method of document reading which takes measures to prevent a change in load on a transport system from occurring during image reading without lowering the copying productivity nor degrading the separating efficiency.

In order to attain the object, a document feeder according to the present invention comprises: a stacking section on which a plurality of documents are stacked; separating/feeding means for separating a document from the documents stacked on the stacking section and feeding the documents one by one; reading means for reading an image of the fed document at a specified position; and transporting means for transporting the fed document to a reading position where image reading is carried out by the reading means; and the separating/feeding means feeds a document at a higher speed than the transporting means does.

Because of the speed difference, the document curves between the separating/feeding means and the transporting means. When the trailing edge of the document passes the separating/feeding means, a change in load which occurs at this time is absorbed in the curved portion of the document.

This arrangement eliminates the necessity of circulating the document, thereby lowering the copying productivity, and the necessity of degrading the separating efficiency, which have been taken for the purpose of suppressing noise during image reading. Also, this is only speed control and never increases the size of the apparatus.

Another document feeder according to the present invention adopts an arrangement of setting the distance between the separating/feeding means and the reading position longer than the length of a document in the feeding direction instead of or in addition to adopting the speed control. In this structure, after the trailing edge of a document passes the separating/feeding means, the leading edge of the document reaches the reading position, and image reading is started. Therefore, even if the load on the transporting means changes when the trailing edge of the document passes the separating/feeding means, the change in load never influences the image reading. Needless to say, this arrangement does not lower the copying productivity and does not degrade the separating efficiency.

Preferably, only when large documents are to be fed, the distance between the separating/feeding means and the reading position is lengthened. For this purpose, detecting means for detecting the length of documents stacked on the stacking section is provided, and when the documents are judged to be long in the feeding direction, the stacking means and the separating/feeding means are moved backward together, or the route is changed so that each of the documents takes a bypass with a longer length.

Further, another document feeder according to the present invention comprises a document curving area where while the leading edge of a fed document is held at a position immediately before the reading position by the transporting means, the document curves until the trailing edge of the document passes the separating/feeding means. In this structure, after the trailing edge of a document passes the separating/feeding means, image reading is started. Therefore, a change in load which occurs when the trailing edge of a document passes the separating/feeding means never influences image reading. This arrangement does not lower the copying productivity and does not degrade the separating efficiency.

BRIEF DESCRIPTION OF THE DRAWINGS

This and other objects and features of the present invention will be apparent from the following description with reference to the accompanying drawings, in which:

FIG. 1 is a sectional view of an electrophotographic copying machine and a document feeder which is a first embodiment of the present invention;

FIG. 8 is a schematic view of the main part of a document feeder which is a third embodiment of the present invention;

FIG. 9 is an illustration of the document feeder of the third embodiment, showing a case of feeding a large size document;

FIG. 10a is a schematic view of the main part of a document feeder which is a fourth embodiment of the present invention;

FIG. 10b is a bottom view of the feed roller and the paddles shown in 10a.

FIG. 11 is an illustration of the document feeder of the fourth embodiment, showing a time when a document curves;

FIG. 13 is a schematic view of the main part of a document feeder which is a fifth embodiment of the present invention.

DETAILED DESCRIPTION OF THE PREFERRED EMBODIMENTS

Figure 2:
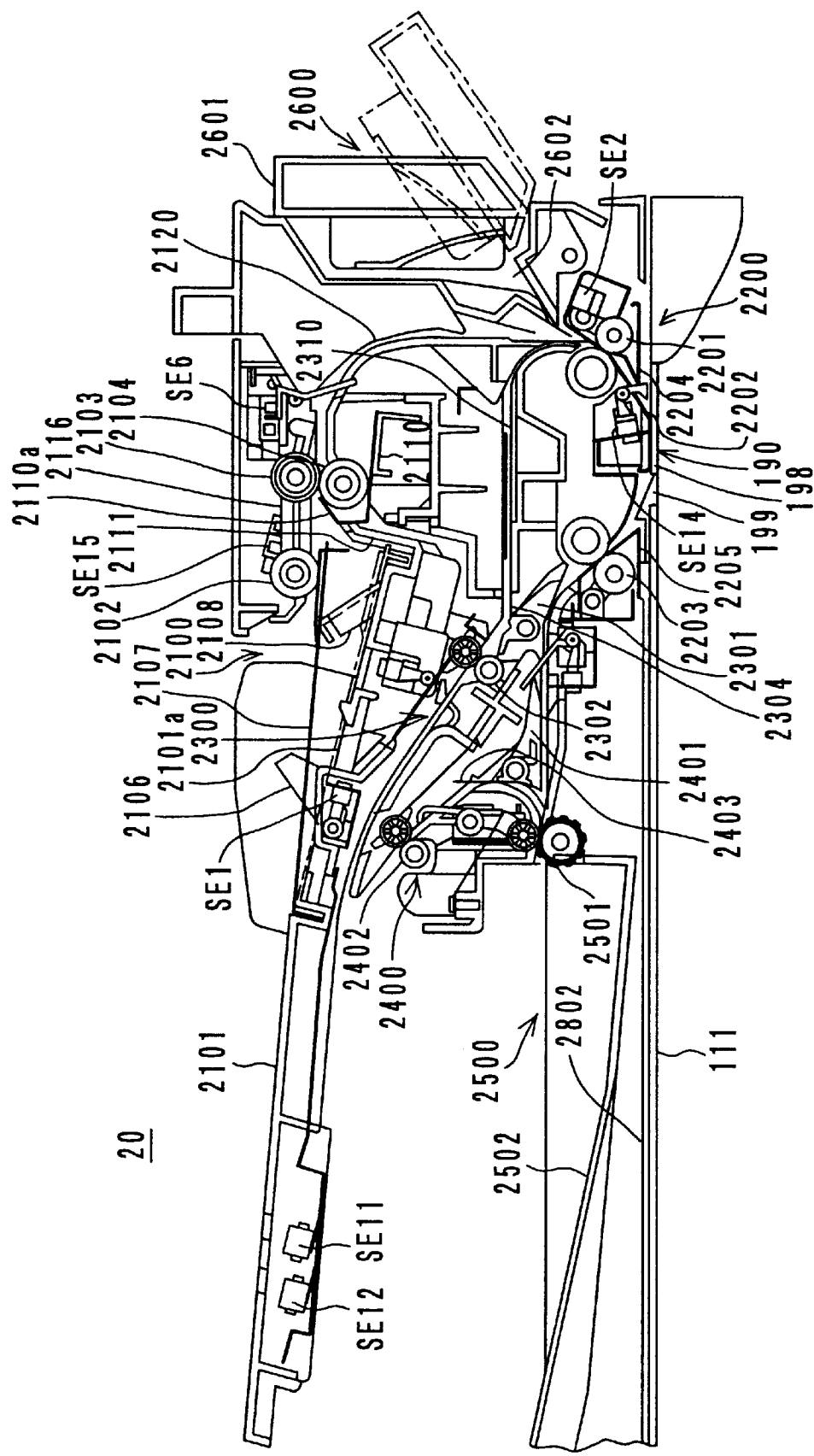
FIG. 2 is a sectional view of the document feeder, showing the internal structure.

Some embodiments of the present invention are described with reference to the accompanying drawings. In the embodiments, a document feeder is attached to an electrophotographic copying machine.

First Embodiment; See FIGS. 1 Through 6

General Structure of Copying Machine

A copying machine 10 mainly comprises an image reading optical system 11, a laser optical unit 13, an image forming section 14 and a sheet feeding section 15.

Image Reading Optical System

The image reading optical system 11 is located right under a platen glass 111 which is the top surface of the copying machine 10. The optical system 11 comprises a lamp 112 for irradiating a document which is set on the platen glass 111 or is fed by a document feeder 20 which will be described later, reflection mirrors 113, 114 and 115, a lens 116 with a function of varying magnification and a CCD sensor 117.

A document scale 101 is disposed at the left end of the platen glass 111 so that an operator can set a document on the platen glass 111 in a right position. While lifting up the document feeder 20, an operator sets a document on the platen glass 111 putting the document face down and matching one end of the document to the document scale 101. The image reading optical system 11 reads the image of the document which has been manually set on the platen glass 111 in the following way: while the lamp 112 is irradiating the document, the lamp 112 and the mirrors 113, 114 and 115 move in a direction indicated by arrow "b" to scan the image of the document; and the scanned light is focused on the CCD sensor 117 through the lens 116, whereby the image is read by the CCD sensor 117.

The lamp 112 and the mirror 113 move in the direction of arrow "b" at a speed of V/m, wherein V is the circumferential speed of a pohotosensitive drum 121 (constant regardless of the copying magnification) and m is the copying magnification. Meanwhile, the mirrors 114 and 115 move in the direction of arrow "b" at a speed of V/2m. Thereby, scanning for image reading is carried out while the optical path length is kept constant.

Also, a slit glass 198 is disposed at the right end of the platen glass 111 so that the image of a document which is fed at a constant speed by the document feeder 20 can be read. For this type of image reading, the lamp 112 and the mirror 113 are set stationary under the slit glass 198, and the mirrors 114 and 115 are set stationary at such positions to make a necessary optical path length. While the lamp 112 is irradiating a document which passes over the slit glass 198 at a constant speed (which depends on the copying magnification m), the CCD sensor 117 reads the image of the document. A guide plate 199 is provided at the left end of the slit glass 198 to pick up a document from the slit glass 198.

The structure in which the document feeder 20 can be lifted for manual setting of a document on the platen glass 111 is well known. Documents of ordinary regular sizes are fed by the document feeder 20 and are subjected to document-feeding image reading as described above. Documents of materials and/or sizes unsuited to be fed by the document feeder 20 are set on the platen glass 111 manually and are subjected to optical-system-moving image reading.

Laser Optical Unit

The image read by the CCD sensor 117 is reproduced on the photosensitive drum 121 as an electrostatic latent image through the laser optical unit 13. More specifically, image data read by the CCD sensor 117 are processed into print data by an image processing section 12, and a laser diode 131 is modulated in accordance with the print data. A laser beam emitted from the laser diode 131 is deflected by a polygon mirror 135 which rotates at a high speed, and the deflected light passes through a troidal lens 136 and an fθ lens 137 and is focused on the photosensitive drum 121 via reflection mirrors 138a, 138b and 138c.

Image Forming Section

In the image forming section 14, around the photosensitive drum 121, the followings are provided in order in a direction indicated by arrow "a" which is the direction of rotation of the photosensitive drum 121: an electrifying charger 122, a developing device 123, a transfer charger 124, an erasing charger 125, a sheet separating pawl 126, a residual toner cleaner 127 and a residual charge eraser 128. Since the structures and operations of these elements are well known, the descriptions thereof are omitted.

Sheet Feeding Section

The copy sheet feeding section 15 comprises cassettes 151, 152 and 153, sheet transport paths, etc. The cassettes 151, 152 and 153 are disposed on three different levels, and a pick-up roller 154, a feed roller 155 and a separation roller 156 are provided to each of the cassettes 151, 152 and 153.

A cassette is selected from the cassettes 151, 152 and 153, and sheets are fed out of the selected cassette one by one in response to a feed signal. A sheet fed out of the cassette is transported upward by transport rollers 171, 172 and 173 and is stopped at timing rollers 174. Then, the timing rollers 174 are rotated in synchronization with an image formed on the photosensitive drum 121, whereby the sheet is fed to a transfer section.

The sheet receives a toner image at the transfer section, and immediately the sheet is separated from the photosensitive drum 121 and is fed between fixing rollers 176 and 177 by a conveyer belt 175, where the toner image is fixed on the sheet. Then, the sheet is discharged from the copying machine to a tray or to a sorter through discharge rollers 178.

Further, the copying machine 10 has a transport section 18 which diverges at a point immediately before the discharge rollers 178, a switchback section 19 and a refeeding section 16. This sheet transport system is well known, and the description thereof is omitted.

General Structure of Document Feeder

As FIG. 2 shows, the document feeder 20 is composed mainly of the following sections:

a separating/feeding section 2100 which comprises a document tray 2101, a pick-up roller 2102, a feed roller 2103 and a separation roller 2104;

a reading section 2200 which comprises a first pair of read rollers 2201, a pressing guide plate 2202, a second pair of read rollers 2203, an entrance side guide plate 2204 and an exit side guide plate 2205;

a circulation inverting section 2300 which comprises a diverter 2301, a pair of circulation inversion rollers 2302 and a circulating path 2310;

a discharge inverting section 2400 which comprises a diverter 2401 and a pair of discharge inversion rollers 2402;

a discharging section 2500 which comprises a pair of discharge rollers 2501 and a discharge tray 2502;

a manual feeding section 2600 which comprises a manual feed tray 2601 and a manual feed port 2602; and a document pressing plate 2802 which presses a document which has been manually set on the platen glass 111.

The document feeder 20 is operable in a simplex document mode to read the image of a simplex document (a document with an image on only one side), in a duplex document mode to read both images of a duplex document (a document with images on both sides) and in a single feed mode to handle documents which are unsuited to be automatically fed by the separating/feeding section 2100.

Separating/Feeding Section

The document tray 2101 has a tilting portion 2101*a* at its bottom half, and a leading edge regulating plate 2111 is provided at the end of the tilting portion 2101*a*. A lift-up plate 2107 is attached to the document tray 2101 in such a way to be capable of pivoting up and down on its own left end, and the lift-up plate 2107 is initially on a level with the tilting portion 2101*a*.

A set of documents are placed on the tray 2101 with the leading edge in contact with the regulating plate 2111. The lift-up plate 2107 moves up following a drive lever 2108 which is moved upward by a lift-up motor. Thereby, the upper surface of the set of documents comes into contact with the pick-up roller 2102. The pick-up roller 2102 is capable of pivoting on a shaft of the feed roller 2103 via an arm 2116 and is pulled downward by its own weight and a spring (not shown). The pick-up roller 2102 is lifted up by the lift-up plate 2107 which moves up following the drive lever 2108, and when it is detected by an upper limit sensor SE15 that the arm 2116 has pivoted up to a specified position, the drive lever 2108 is stopped. The state of the upper limit sensor SE15 is monitored at all times, and when the sensor SE15 comes to a non-detecting state because the pick-up roller 2102 moves down, the drive lever 2108 is moved up so as to move up the lift-up plate 2107. In this way, the pick-up roller 2102 is kept on a specified level and picks up documents with a specified pressure constantly. Thereby, the leading edge of documents comes into contact with a pre-separating guide tab 2110*a* from the specified height at a specified angle constantly regardless of the volume of the rest of documents, which results in stable feeding.

The pre-separating guide tab 2110*a* is attached to a holder 2110 and extends upward from the upper end of the leading edge regulating plate 2111 so that the end of the pre-separating guide tab 2110*a* is close to the nip portion between the feed roller 2103 and the separation roller 2104 with a slight gap. Although some documents are fed by the pick-up roller 2102 at a time, when the leading edge of the documents come into contact with the pre-separating guide tab 2110*a*, the documents are so guided that the upper documents will come forward. Thereby, a few documents comes to the nip portion between the rollers 2103 and 2104.

The feed roller 2103 is driven to rotate couterclockwise and transports the uppermost of the documents fed between the rollers 2103 and 2104 to the right. Meanwhile, the other documents are prevented from traveling forward by the roller 2104. The feed roller 2103 is driven to rotate in a regular position shown in FIG. 2. The separation roller 2104 is supported by the holder 2110 in such a way to rotate freely and is pulled by a spring (not shown) via the holder 2110 so as to be elastically in contact with the feed roller 2103. A torque limiter is attached to the separation roller 2104. The torque of the torque limiter is such a value that when there is only one document between the rollers 2103 and 2104, the separation roller 2104 rotates following the feed roller 2103 because of the friction with the document fed by the feed roller 2103. When a plurality of documents come between the rollers 2103 and 2104, the separation roller 2104 stops and prevents the documents other than the uppermost from traveling forward.

Feeding of a Document

A set of documents are placed on the document tray 2101 with the first page facing up. When an operator presses a copy start key (not shown) (in feeding the first document) or when an actuator lever 2106 is pressed by a document, thereby making an empty sensor SE1 detect the presence of a document (in feeding the second or the succeeding document), the pick-up roller 2102 is driven to rotate couterclockwise at a specified time, whereby documents are fed to the right in FIG. 2.

The picked-up documents are preliminarily separated by the pre-separating guide tab 2110*a,* and the feed roller 2103 and the separation roller 2104 allow only one document to pass through the nip portion.

The succeeding feeding processes are described separately with respect to a simplex document and with respect to a duplex document.

Simplex Document Mode

The only one document which has passed through the nip portion between the rollers 2103 and 2104 travels in a transport path 2120. Then, the leading edge of the document collides with the nip portion of the first read rollers 2201 which are stationary at this time, and the leading portion makes a loop of a proper size. Thereby, the leading edge of the document is regulated by the nip portion of the first read rollers 2201, and possible skew of the document is corrected. Thereafter, the read rollers 2201 and 2203 are driven to rotate, whereby the document is fed on the slid glass 198 pressed by the guide plate 2202. Meanwhile, the image of the document is read by the reading optical system 11. The document is further transported from the second read rollers 2203 to the left guided by the lower surfaces of the diverters 2301 and 2401. Then, the document is discharged onto the discharge tray 2502 through the discharge rollers 2501 with its imaged-side facing down. Based on the detection of the trailing edge of the document by a sensor SE6, feeding of the next document is started.

The speed of rotation of the read rollers 2201 and 2203 is altered in accordance with the copying magnification. If the copying magnification is m and if the transport speed of the read rollers 2201 and 2203 to attain a copying magnification of 1 is V (which is equal to the circumferential speed of the photosensitive drum 121), the transport speed of the read rollers 2201 and 2203 is automatically set to V/m.

The reading optical system 11 starts image reading at a specified time after a read sensor SE14 located right after the first read rollers 2201 detects the leading edge of a document. More specifically, the running amount of the drive motor of the read rollers 2201 and 2203 since the detection of the leading edge of the document by the sensor SE14 is monitored, thereby timing the start of image reading to the arrival of the leading edge of the document at the reading position 190.

Manual Feeding

The manual feed port 2602 is located upstream of the first read rollers 2201, and is opened by laying the manual feed tray 2601 outward. Then, an operator inserts a document in the port 2602 until the leading edge of the document comes into contact with the nip portion between the first read rollers 2201, and the read rollers 2201 and 2203 are driven to rotate. Thereby, the document is fed on the slit glass 198, and the image of the document is read in the same manner as described with respect to a simplex document. The rotation of the read rollers 2201 and 2203 is started at a specified time after the register sensor SE2 detects the leading edge of the document.

Duplex Document Mode

A duplex document fed from the document tray 2101 is transported on the slit glass 198 by the read rollers 2201 and 2203 in the above-described manner, and meanwhile the image on a first side of the document is read. At this time, the diverter 2301 is set in a position slightly clockwise from the position shown by the slid line in FIG. 2. Accordingly, the document whose first side has been subjected to image reading is guided to the circulation inversion rollers 2302 by an inclined surface of the diverter 2301. When the trailing edge of the document has passed the resin film 2304, the inversion rollers 2302 are driven to rotate in reverse, whereby the document is fed into the circulating path 2310 with its leading edge trailing. Thereafter, the document is fed to the first read rollers 2201 upside down. Then, the leading edge of the document comes to the nip portion of the stationary first read rollers 2201, and when the leading portion makes a loop, the rotation of the inversion rollers 2302 is stopped. With this operation, the leading edge of the document is aligned, and possible skew of the document is corrected.

Thereafter, the read rollers 2201 and 2203 are driven to rotate, whereby the document is transported on the slit glass 198 with its second side facing down, and meanwhile, the image on the second side is read. At this time, the diverter 2301 is back in the position shown by the solid line in FIG. 2, and the diverter 2401 is set in a position slightly clockwise from the position shown by the solid line in FIG. 2. Accordingly, the document whose second side has been subjected to image reading is guided by the lower surface of the diverter 2301 and the upper surface of the diverter 2401 to the discharge inversion rollers 2402. When the trailing edge of the document has passed the resin film 2403, the rotation of the discharge inversion rollers 2402 is reversed. Thereby, the document is inverted upside down and with leading edge trailing, and is discharged onto the discharge tray 2502 through the discharge rollers 2501 guided by the resin film 2403. In this way, the document is discharged onto the discharge tray 2502 with its first side facing down, resulting in collation of a set of duplex documents. In this duplex document mode, when the trailing edge of a document is detected by the register sensor SE2 during image reading of its second side, feeding of the next document is started.

Driving System

Figure 3:
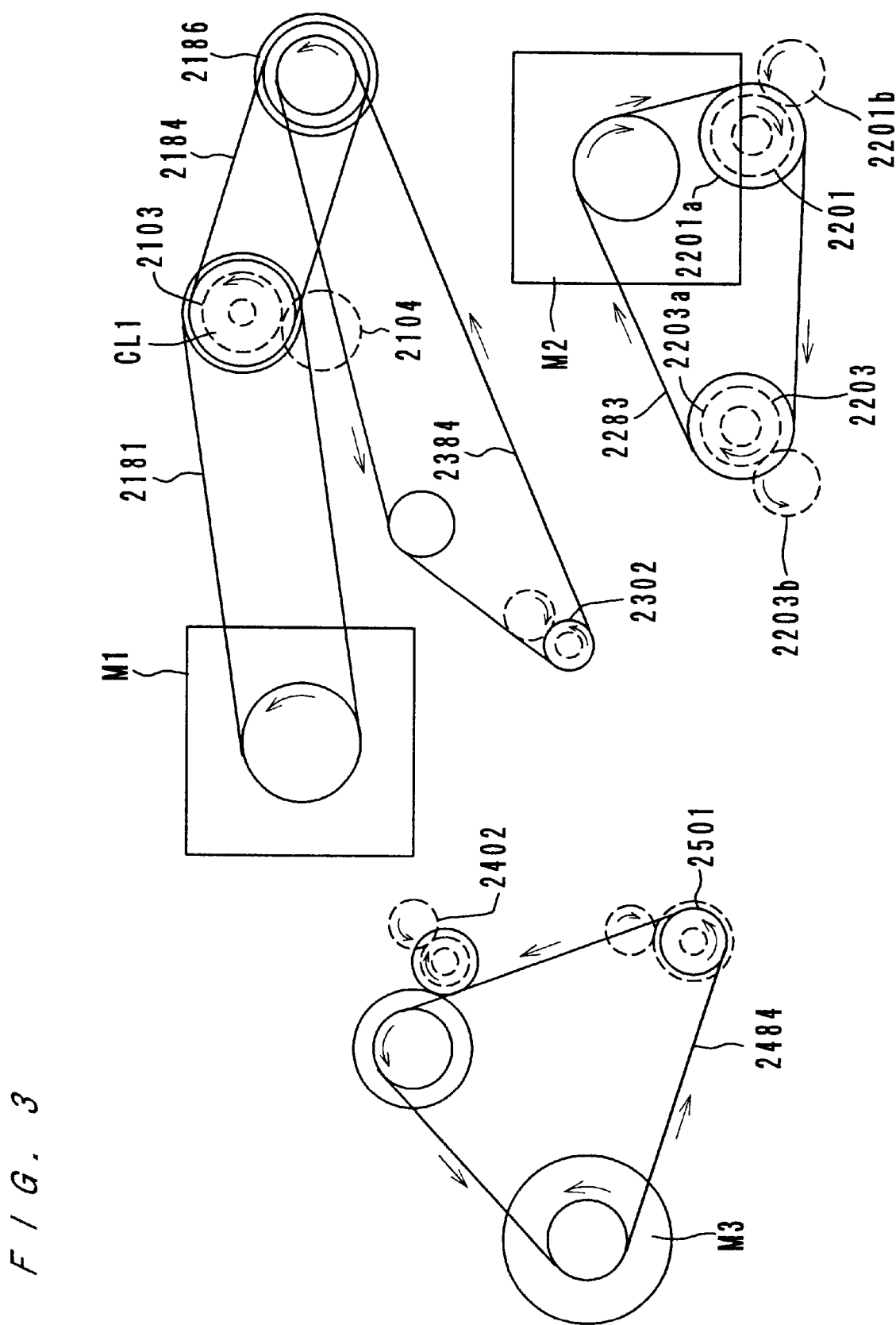
FIG. 3 is a schematic view of a driving system for a transport mechanism of the document feeder.

FIG. 3 shows a driving system for execution of the above-described operation. The feed roller 2103 and the circulation inversion rollers 2302 are driven by a reversible motor M1. The feed roller 2103 is connected to a clutch CL1 by a belt 2181 and driven via the clutch CL1. The pick-up roller 2102 is provided with a rotating force via the feed roller 2103. When the trailing edge of a document passes the nip portion between the rollers 2103 and 2104, the clutch CL1 is turned off. The circulation inversion rollers 2302 are provided with a rotating force via a belt 2184, a pulley 2186 and a belt 2384. When the document is transported toward the first read rollers 2201, the circulation inversion rollers 2302 are driven to rotate in such a direction to transport a document left upward.

The read rollers 2201 and 2203 are driven to rotate by a transport motor M2 via a belt 2283.

The discharge inversion rollers 2402 and the discharge rollers 2501 are driven to rotate by a reversible discharge motor M3 via a belt 2484. When the discharge inversion rollers 2402 are driven to rotate in such a direction to transport a document right downward, the discharge rollers 2501 are driven to rotate in such a direction to discharge a document onto the tray 2502.

The document feeder 20 operates in the simplex document mode or in the duplex document mode in accordance with the selection of an operator. When a plurality of documents are set on the tray 2101, the feeder 20 feeds/transports the document one by one in the above-described manner. When the number registered by the operator (the number of copies to be made) is two or more, image data read by the optical system 11 are stored in a memory, and copies are made from the data.

Detection of Document Size

In order to carry out various copying processes efficiently and rapidly in the copying machine 10 using the document feeder 20, it is necessary to detect the size of a document.

First, on the document tray 2101, the lengths of documents can be discriminated into a plurality of sizes. For the detection, sensors SE11 and SE12 are provided in the end portion of the tray 2101. By use of the sensors SE11 and SE12, three document lengths can be discriminated. Additionally, the size of a document fed from the tray 2101 is detected by a sensor SE6, etc. This will be described in detail later.

Document Transport Speed

In the first embodiment, the feed rollers 2103 is kept driven while the image of a document is being read. The transport speed $V_1$ of the feed roller 2103 and that $V_2$ of the read rollers 2201 and 2203 during image reading have a mutual relationship of $V_1 > V_2$. The difference between the speeds $V_1$ and $V_2$ is in a range from approximately 2 to 3% to 20%, preferably from 5% to 10%. If the speed difference is too big, a document may be pushed forward, thereby causing noise during image reading.

Driven Load of the Feed Roller

Figure 4:
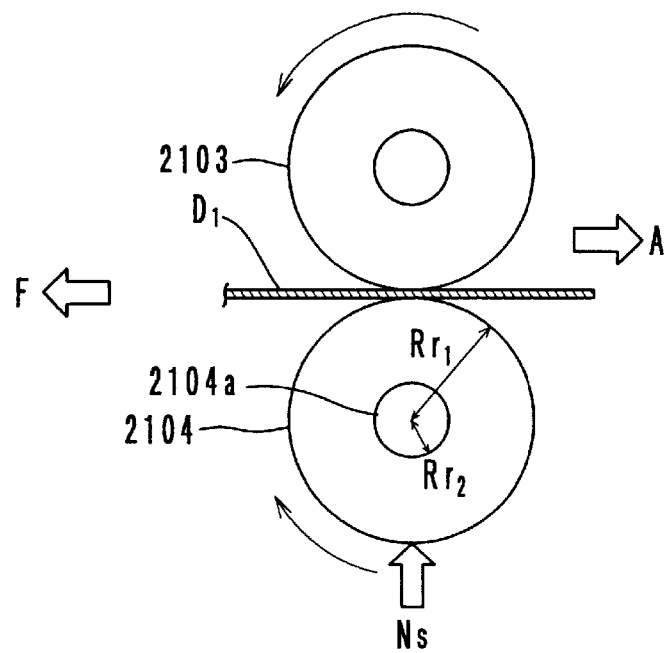
FIG. 4 is an illustration showing separating/feeding operation of the document feeder.
Figure 5:
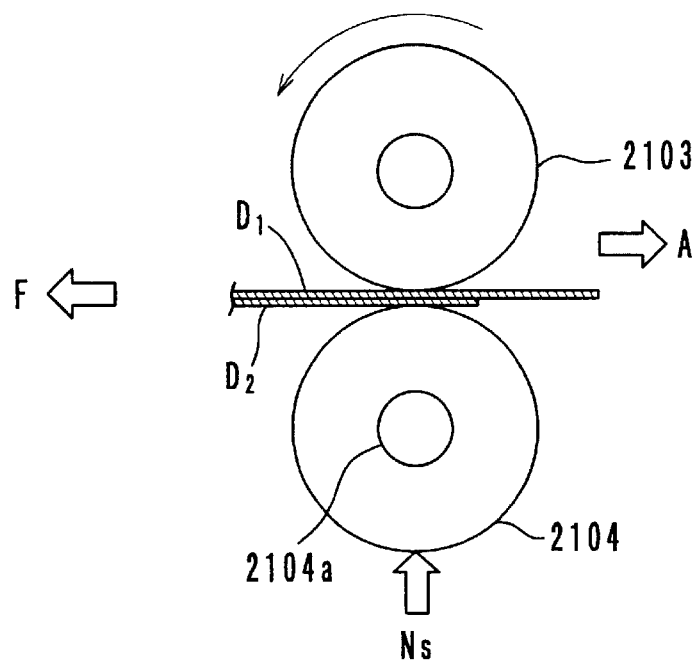
FIG. 5 is an illustration showing separating/feeding operation of the document feeder.

As mentioned above, the feed roller 2103 is driven to rotate to transport a document in a direction indicated by arrow "A" (see FIGS. 4 and 5) by the feed motor M1 via the clutch CL1. The separation roller 2104 is held by a holder 2110 and freely rotates. The roller 2104 is pressed against the feed roller 2103 with a pressure (separating pressure) Ns. Further, a torque limiter is provided between the separation roller 2104 and a shaft 2104a fixed on the holder 2110. The forward rotation torque of the torque limiter is a value which is calculated by multiplying a frictional force with a document $D_1$ (when only one document $D_1$ exists in the nip portion between the rollers 2103 and 2104 as shown by FIG. 4) traveling in the direction of arrow "A" pushed by the feed roller 2103 by the radius $Rr_1$ of the roller 2104. When two or more documents $D_1$ and $D_2$ come to the nip portion between the rollers 2103 and 2104 as shown by FIG. 5, the torque limiter does not work, and the separation roller 2104 does not rotate. Thereby, the second and lower documents $D_2$ are stopped at the nip portion, and only the first (uppermost) document $D_1$ is transported in the direction of arrow "A".

In this structure, the driven load F in a case of driving the feed roller 2103 during image reading (while the read rollers 2201 and 2203 are transporting a document) and that in a case of not driving the feed roller 2103 during image reading are compared.

Symbols used in the following expressions (1), (2), (3) and (4) mean as follows:

$Tf_1$ is the idling torque of the one-way clutch of the feed roller;

$\mu f_2$ is the coefficient of friction between the feed roller and its shaft;

Ts is the forward rotation torque of the torque limiter;

Ns is the separating pressure;

$\mu r_2$ is the coefficient of friction between the separation roller and its shaft;

$\mu f_1$ is the coefficient of friction between the feed roller and a document;

$\mu r_1$ is the coefficient of friction between the separation roller and a document; and $\mu p$ is the coefficient of friction between documents.

When a single document exists in the nip portion between the rollers 2103 and 2104 with the feed roller 2103 undriven, the driven load F is expressed by the following expression (1).

$$F = (Tf_1/Rf_1) + \mu f_2 \cdot Ns(Rf_2/Rf_1) + (Ts/Rr_1) + \mu r_2 \cdot Ns(Rr_2/Rr_1) \quad (1)$$

When two or more documents exists in the nip portion between the rollers 2103 and 2104 with the feed roller 2103 undriven, the driven load F is expressed by the following expression (2).

$$F = (Tf_1/Rf_1) + \mu f_2 \cdot Ns(Rf_2/Rf_1) + \mu p \cdot Ns \quad (2)$$

When a single document exists in the nip portion between the rollers 2103 and 2104 with the feed roller 2103 driven, the driven load F is expressed in the following expression (3).

$$F = -\mu f_1 \cdot Ns + \mu f_2 \cdot Ns(Rf_2/Rf_1) + (Ts/Rr_1) + \mu r_2 \cdot Ns(Rr_2/Rr_1) \quad (3)$$

When two or more documents exist in the nip portion between the rollers 2103 and 2104 with the feed roller 2103 driven, the driven load F is expressed by the following expression (4).

$$F = -(\mu f_1 \cdot Ns) + \mu f_2 \cdot Ns(Rf_2/Rf_1) + \mu p \cdot Ns \quad (4)$$

As is apparent from the expressions (1) through (4), during image reading, when the feed roller 2103 is driven, the driven load F is smaller, and accordingly, a change in driving load which occurs when the trailing edge of a document passes the nip portion between the rollers 2103 and 2104 will be smaller.

Further, in this driving control, turning-off of the clutch CL1 to stop the drive of the pick-up roller 2102 and the feed roller 2103 is carried out when it is judged based on detection signals sent from the sensors SE11 and SE12 provided on the document tray 2101 that the trailing edge of a document has passed the nip portion between the rollers 2103 and 2104. At the same time, the speed of the feed motor M1 is changed to a speed for feeding, and when the trailing edge of the document is detected by the sensor SE6, the clutch CL1 is turned on to start feeding of the next document.

Control Circuitry

Figure 6:
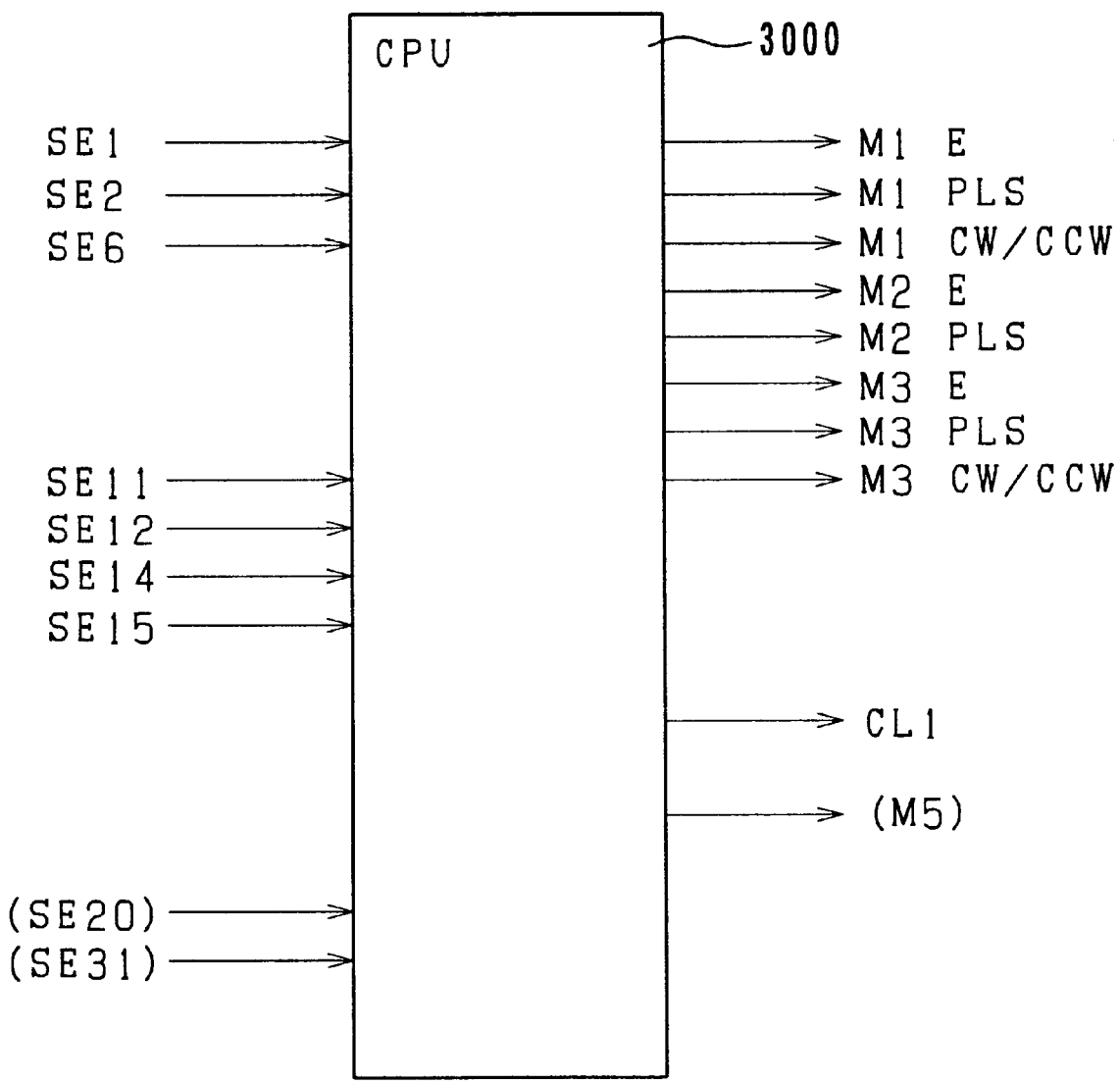
FIG. 6 is a block diagram showing the control circuitry.

FIG. 6 shows the general structure of the control circuitry of the document feeder 20. The center of this control circuitry is a CPU 3000. The CPU 3000 receives detection signals from the sensors SE1, SE11, SE12, etc. and controls turning-on and turning-off of the motors M1 through M3, etc. In FIG. 6, reference symbols in parentheses denote members used in the second through fifth embodiments which will be described later.

Modifications of the First Embodiment

In the above description, the separation roller 2104 in the separating/feeding section is a frictional roller with a torque limiter. However, as the separation roller 2104, a roller without torque limiter or a roller which is driven to rotate in reverse can be used. Also, a frictional pad or an endless belt can be used instead of a frictional roller. As the feed roller 2103, an endless belt can be used. These modifications are applicable to the second through fifth embodiments described below.

Second Embodiment; See FIG. 7

In the second embodiment, in order to avoid influence of a change in load which occurs when the trailing edge of a document passes the nip portion between the feed roller 2103 and the separation roller 2104 onto the read rollers 2201 which are transporting the document in the reading section, the separating/feeding section 2100 is so structured to be movable so that the transport path from the nip portion between the feed roller 2103 and the separation roller 2104 to the reading position 190 can be set longer than the length of a document.

Figure 7:
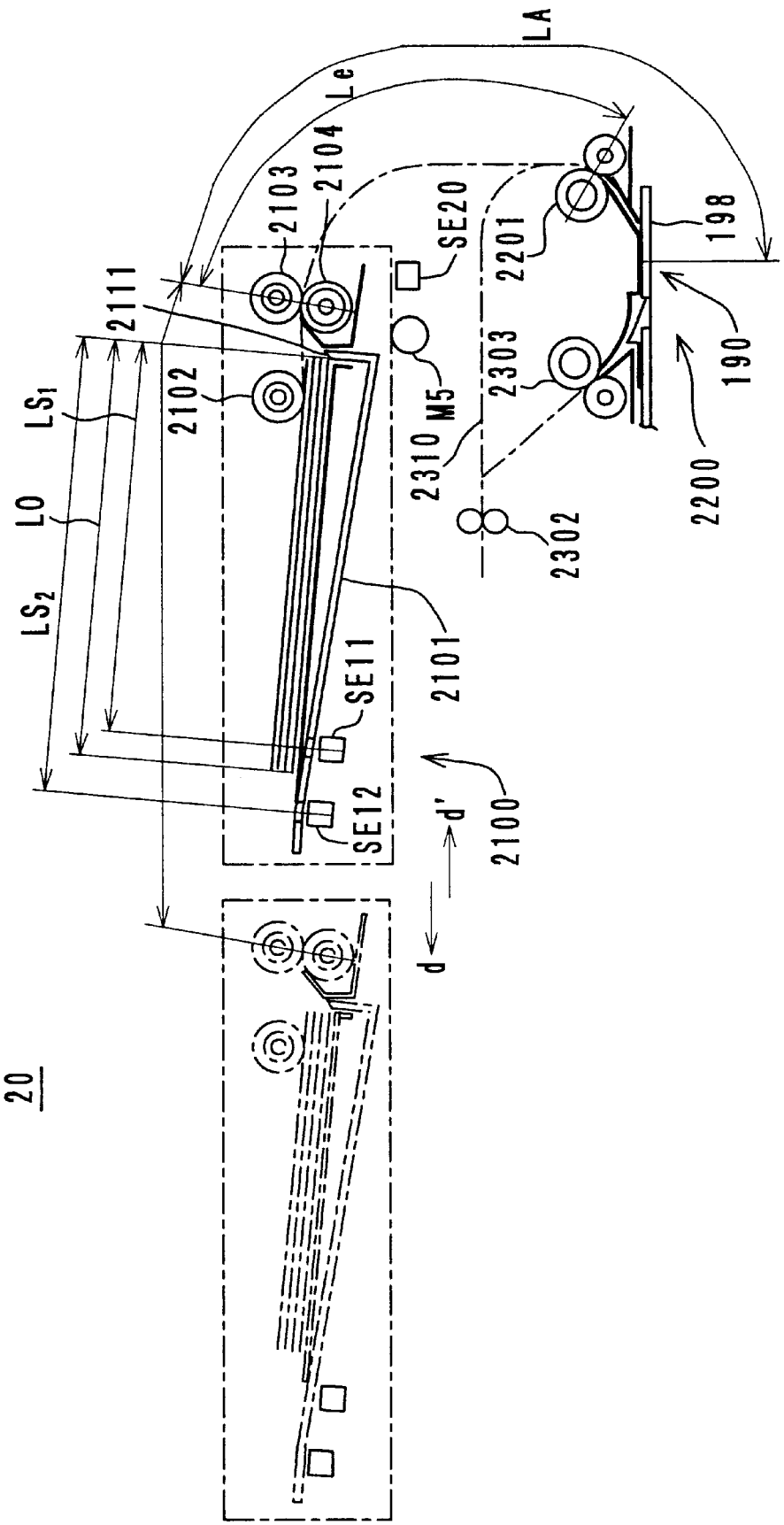
FIG. 7 is a schematic view of the main part of a document feeder which is a second embodiment of the present invention.
Figure 12:
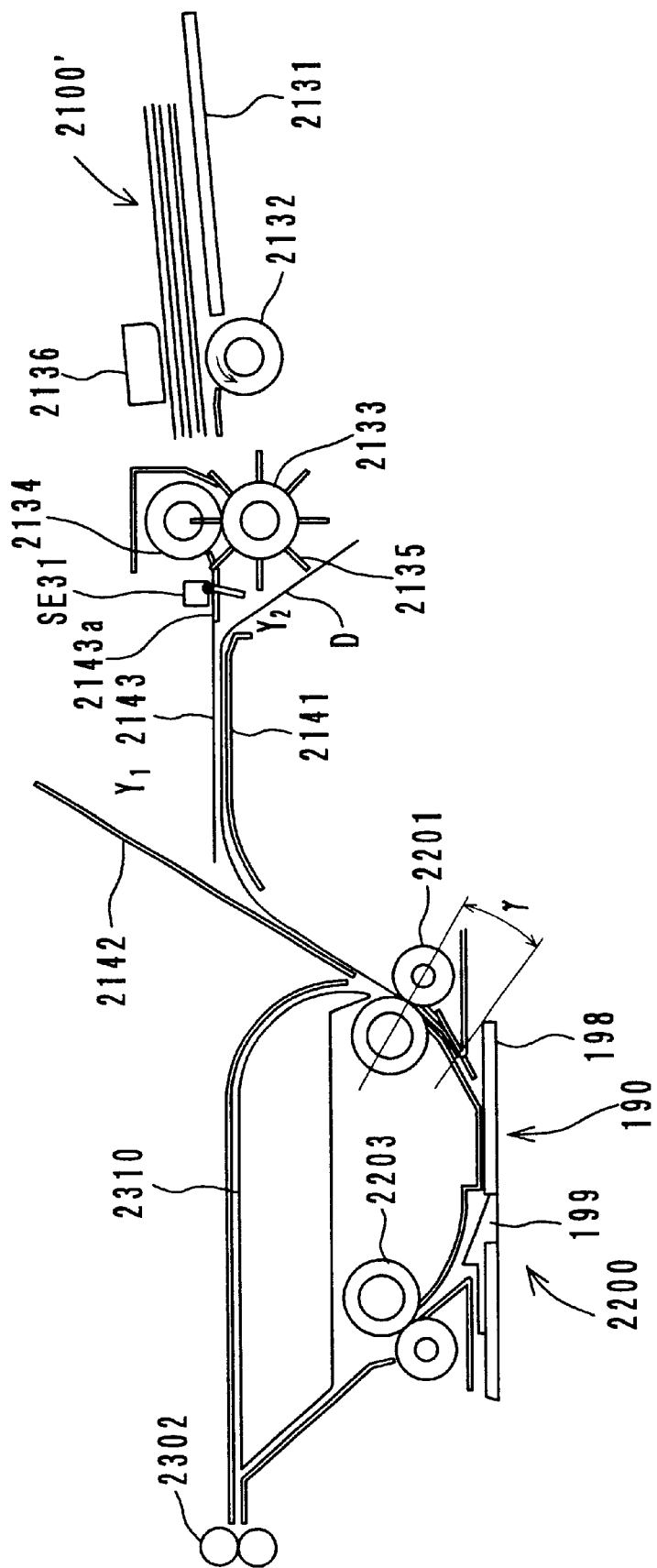
FIG. 12 is an illustration of the document of the fourth embodiment, showing a time when the trailing edge of a document has passed the nip portion between a feed roller and a separation roller.

More specifically, the separating/feeding section 2100 comprising the document tray 2101, the pick-up roller 2102, the feed roller 2103, the separation roller 2104, etc. is formed as a unit, and the separating/feeding unit 2100 is capable of being moved by a motor M5 in direction indicated by arrows "d" and "d'". The position of the separating/feeding unit 2100 shown by the solid line in FIG. 7 is a reference position which is for a minimum document size. The separating/feeding unit 2100 is moved from the reference position in the direction of arrow "d" by a distance in accordance with the length in the feeding direction of a document set on the tray 2101.

In order to avoid influence of a change in load which occurs in an upstream position onto image reading in a downstream position with the position of the separating/feeding unit 2100 fixed for all document sizes, the separating/feeding unit 2100 must be fixed in a position in accordance with the length of a maximum document size. However, as in the second embodiment, when the separating/feeding unit 2100 is so structured to be capable of sliding, the time it takes to make the first copy of a smaller size document can be shortened.

In order to control the travel distance of the separating/feeding unit 2100, a motor of which revolutions can be controlled, such as a stepping motor, a servo motor, etc., is used as the motor M5, and the travel distance is controlled based on a detection signal from a reference position detection sensor SE20.

The separating/feeding unit 2100 is movable within such a range as to change the transport path length LA from the nip portion between the rollers 2103 and 2104 to the reading position 190 within a range from the length of a minimum document size (in the feeding direction) plus a clearance α to the length of a maximum document size plus the clearance α.

The length of a document set on the tray 2101 is detected by the sensors SE11 and SE12 as in the first embodiment. By the sensors SE11 and SE12, three different lengths can be discriminated; however, it is possible to so structure the separating/feeding unit 2100 as to discriminate more different document sizes.

Now, the relationship between the detection states of the sensors SE11 and SE12 and the travel distance of the separating/feeding unit 2100 is described. The reference symbols used in the following description mean as follows:

LA is the distance from the nip portion between the rollers 2103 and 2104 to the reading position 190;

$LS_1$ is the distance from the leading edge regulating plate 2111 to the sensor SE11;

$LS_2$ is the distance from the leading edge regulating plate 2111 to the sensor SE12;

LO is the length in the feeding direction of a document; and

α is a clearance which is longer than the distance by which a document is transported from the time when the trailing edge of a document passes the nip portion between the rollers 2103 and 2104 to the time when a change in load which has been caused by the passage of the document attenuates.

In this second embodiment, because only two sensors SE11 and SE12 are provided to detect the length of a document, documents can be discriminated into three groups of different lengths. On the other hand, with respect to document sizes, there are a plurality of sizes shorter than $LS_1$; there are a plurality of sizes longer than $LS_2$; and there are a plurality of sizes between $LS_1$ and $LS_2$. Therefore, it is impossible to detect the actual length of a document. In this structure, a document is judged to be of the maximum of the sizes included in the group detected by the sensors SE11 and SE12. If both the sensors SE11 and SE12 are in their respective non-detecting states, $LO<LS_1$, and LA is set to $LS_1+\alpha$ (reference position). If the sensor SE11 is in its detecting state and if the sensor SE12 is in its non-detecting state, $LS_2>LO>LS_1$, and LA is set to $LS_2+\alpha$. If both the sensors SE11 and SE12 are in their respective non-detecting states, $LO>LS_2$, and LA is set to the maximum document size+α.

Although feeding of a first document may be started on the completion of the movement of the separating/feeding unit 2100, in order to shorten the time to make the first copy, it is better to start feeding during the movement of the separating/feeding unit 2100. In the latter case, the system is so arranged that the movement of the separating/feeding unit 2100 is completed before a fed document comes to the first read rollers 2201. More specifically, the following expression (5) shall be fulfilled.

$$(Ld/Vb)+\beta=(Ld+Le)/Va \quad (5)$$

Va: feed speed

Vb: moving speed of the separating/feeding unit

Ld: distance from the reference position to the position for the maximum document size Le: distance from the nip portion between the rollers 2103 and 2104 in the reference position to the first read rollers 2201

β: clearance

Third Embodiment; See FIGS. 8 and 9

In the third embodiment, a document curving area Y is formed in the transport path from the nip portion between the feed roller 2103 and the separation roller 2104 to the reading position 190. Thereby, a large size document is fed in a circuitous route so that a change in load which occurs when the trailing edge of the document passes the nip portion between the rollers 2103 and 2104 will not influence image reading by the read rollers 2201.

More specifically, in the transport path from the nip portion between the rollers 2103 and 2104 to the reading section 2200, a movable guide plate 2124 which is movable within a range from the position shown in FIG. 8 to the position shown in FIG. 9 is provided. The movable guide plate 2124 is pivoted on a shaft (not shown) which is located near the shaft 2201a of the first read rollers 2201. For a small size document, the movable guide plate 2124 is set in the position shown in FIG. 8 and guides the document fed from the rollers 2103 and 2104 to the first read rollers 2201 in cooperation with guide plates 2125 and 2127. On the other hand, for a large size document, the movable guide plate is set in the position shown in FIG. 9. The guide plate 2125 and another guide plate 2126 are fixed in the respective positions shown in FIG. 8. The guide plate 2127 is pulled toward the movable guide plate 2124 by a spring (not shown), and because the guide plate 2127 has a projection 2127a which is in contact with the movable guide plate 2124, a specified gap is formed between the guide plates 2124 and 2127. For feeding of a large size document, the guide plate 2127 pivots to the position shown in FIG. 9 following the movable guide plate 2124.

Now, feeding/transport of a large size document is described. At the start of feeding, the guide plates 2124 and 2127 are in the positions shown in FIG. 8. A document fed from the rollers 2103 and 2104 is guided by the guide plates 2124, 2125 and 2127, and the leading edge of the document comes to the nip portion of the first read rollers 2201, which are not rotating at this time. For registration of the document, the feed roller 2103 is still kept rotating. Then, the first read rollers 2201 are driven, and when the document travels by a distance γ by which the leading edge of the document does not reach the reading position 190, the first read rollers 2201 are stopped once. Simultaneously, the movable guide plate 2124 is moved to the position shown in FIG. 9 by a driving source (not shown). At this time, as described above, the guide plate 2127 moves following the movable guide plate 2124.

If the movable guide plate 2124 is moved while the first read rollers 2201 are registering the leading edge of a document, the leading edge of the document may come out of the nip portion of the rollers 2201, thereby resulting in a failure in registration or a failure in transportation. The travel of the document by the distance γ ensures that the leading portion of the document will be nipped by the rollers 2201, and the movement of the movable guide plate 2124 in this state will not cause a failure in registration and/or a failure in transportation. When the movable guide plate 2124 is set in the position shown in FIG. 9, the large size document takes a circuitous route guided by the guide plates 2124 and 2127.

Thereafter, the read rollers 2201 and 2203 are driven again to transport the document, and the image of the document is read. The trailing edge of the document passes the nip portion between the feed roller 2103 and the separation roller 2104 at least before the document is transported by a distance LE-γ after the resumption of the rollers 2201 and 2203.

Further, the movable guide plate 2124 may be so structured as to be set in a plurality of positions for lengths of documents.

Fourth Embodiment; See FIGS. 10a, 10b, 11 and 12

The fourth embodiment is similar to the third embodiment. A document curving area $Y_1$ which makes a circuitous route for a large size document is provided in the transport path so that a change in load which occurs in an upstream position will not influence transportation of a document in the downstream reading section 2200. In the fourth embodiment, the separating/feeding section 2100' is to feed a set of documents one by one beginning with the lowermost document.

Specifically, the separating/feeding section 2100' comprises a document tray 2131, a pick-up roller 2132, a weight 2136, a feed roller 2133, a separation roller 2134 and paddles 2135 which are fixed coaxially with the feed roller 2133. The reading section 2200 is of the same structure of that of the first embodiment, and although they are not illustrated, the fourth embodiment has a circulation inverting section, a discharge inverting section and a discharging section which are of the same structure of those of the first embodiment.

In the transport path from the separating/feeding section 2100' to the reading section 2200, rigid guide plates 2141 and 2142 are provided, and an elastic guide plate 2143 is provided in parallel to the guide plate 2141. Further, a sensor SE31 for detecting a document is provided. The guide plate 2143 is capable of pivoting on its bottom portion 2143a, and the bottom portion 2143a is very flexible (see FIG. 11). Between the feed roller 2133 and the guide plate 2141, a space $Y_2$ is made.

In the structure, a set of documents placed on the tray 2131 are pressed by the weight 2136, and some lower documents are picked up and fed to the left in FIG. 10a with rotation of the pick-up roller 2132. Thereafter, only one document passes through the nip portion between the feed roller 2133 and the separation roller 2134 and is guided to the left by the guide plates 2141, 2143 and 2142. The leading edge of the document comes to the nip portion of the first read rollers 2201 which are not rotating at this time and is registered. After the registration, the feed roller 2133 is stopped once, and the first read rollers 2201 are driven to transport the document by a distance γ by which the leading edge of the document does not reach the reading position 190. Then, the first read rollers 2201 are stopped. This ensures that the leading portion of the document will be nipped by the first read rollers 2201. Next, the feed roller 2133 is driven again.

The feed roller 2133 is kept driven, and as FIG. 11 shows, the document D curves largely. At this time, the guide plate 2143 pivots upward on the bottom portion 2143a following the curvature of the document D. The drive of the feed roller 2133 is continued until the trailing edge of the document D passes the nip portion between the feed roller 2133 and the separation roller 2134.

If the feed roller 2133 is kept driven until the trailing edge of the document D passes the nip portion between the rollers 2133 and 2134 while the leading edge of the document D is registered by the first read rollers 2201, the leading edge of the document D may come out of the nip portion of the first read rollers 2201, thereby resulting in a failure in registration or a failure in transportation. However, with the arrangement above, the trailing edge of the document D passes the nip portion between the rollers 2133 and 2134 while the leading portion of the document D is certainly nipped by the first read rollers 2201, and a failure in registration and a failure in transportation can be prevented.

With the above-described control in the structure, the trailing edge of a document can pass the nip portion between the rollers 2133 and 2134 before the reading section 2200 starts image reading, and therefore, the image reading is not influenced by a change in load. Because of the document curving area $Y_1$, the path length between the feed roller 2133 and the first read rollers 2201 can be set to a value calculated by subtracting the distance γ and the amount of the loop made by the registration from the minimum document length, and the transport path can be made compact.

When the trailing edge of the document D comes out of the nip portion between the rollers 2133 and 2144, the document D is pushed out by the paddles 2135. At this time, the curved portion of the document D is pushed down by the guide plate 2143. With the forces from the paddles 2135 and the guide plate 2143, the trailing portion of the document D is pushed down from the feed roller 2133 through the space $Y_2$ (See FIG. 12). This prevents the trailing portion of the document D from staying in the vicinity of the rollers 2133 and 2134, and collision between the document D and the next document can be avoided.

As described above, when the trailing edge of a document passes the nip portion between the rollers 2133 and 2134, the trailing portion of the document comes below the feed roller 2133, and accordingly, the sensor SE31 comes to the non-detecting state. Therefore, the next document can be pre-fed (the next document is so fed that the leading portion with a specified length will come out from the nip portion between the rollers 2133 and 2134) while the previous document is in the transport path, which contributes to an improvement in the copying productivity. Also, misdetection of the sensor SE31 due to a stay and a swing of the trailing portion of a document near the sensor SE31 can be prevented, thereby resulting in stable control.

Fifth Embodiment; See FIG. 13

In the fifth embodiment, as the transport path from the nip portion between the feed roller 2103 and the separation roller 2104 to the reading section 2200, a transport path 2151 for small documents and a transport path 2152 for large documents are provided, and the route for a document is switched by a diverter 2153 which is capable of pivoting on a shaft 2153a. In either case of taking the path 2151 or 2152, the trailing edge of a document passes the nip portion between the rollers 2103 and 2104 before the leading edge reaches the reading position 190, so that a change in load does not influence the image reading.

When a set of documents are placed on the tray 2101, the size of the documents is judged to be large or small based on the on/off state of a sensor SE11. Then, based on the detection signal from the sensor SE11, a solenoid (not shown) of the diverter 2153 is turned on or off. Thereby, the diverter 2153 is set in a position to guide a small document into the path 2151 or in a position to guide a large document into the path 2152. Thereafter, the separating/feeding section 2100 starts feeding.

In the fifth embodiment, documents are discriminated into two sizes, that is, a size LOS which is shorter than the distance $LS_1$ between the leading edge regulating plate 2111 and the sensor SE11 and a size LOL which is longer than the distance $LS_1$. The length LAS of the path 2151 and the length LAL of the path 2152 meet the following conditions (6), (7) and (8).

$$LOL > LS_1 > LOS \tag{6}$$

$$LAL = LOL + \alpha \tag{7}$$

$$LAS = LOS + \alpha \tag{8}$$

In the expressions (7) and (8), α is a clearance which is longer than a distance by which a document is fed since the trailing edge of the document passed the nip portion between the rollers 2103 and 2104 until the change in load which occurred at that time attenuates.

In the fifth embodiment, because the route of a document is switched between the paths 2151 and 2152 according to the length of the document, noise during image reading can be suppressed, and additionally, the first copy can be made for the shortest time for the length of the document.

It is possible to provide three or more transport paths according to document sizes.

Other Embodiments

The arrangement of making a difference between the feed speed in the separating/feeding section 2100 and the feed speed in the reading section 2200 described in the first embodiment is applicable to the second through fifth embodiments.

The transport of a document in the reading section 2200 can be carried out by rollers or an endless belt provided on the slit glass 198 instead of or in addition to the read rollers 2201 and 2203 provided before and after the reading position 190.

Although the present invention has been described in connection with the preferred embodiments above, it is to be noted that various changes and modifications are possible to those who are skilled in the art. Such changes and modifications are to be understood as being within the scope of the present invention.

What is claimed is:

1. A document feeder comprising:
   a stacking section on which a plurality of documents of a maximum length are stacked;
   separating/feeding means comprising:
   a feed member for feeding the documents at a first speed and a separation member which separates one of the documents from a remainder of the documents fed by said feed member;
   a reader for reading an image of the one document at a specified position; and
   transporting means for transporting the one document at the specified position at a second speed which is lower than the first speed;
   wherein there are no feeders or transporting means between the separating/feeding means and the transporting means.

2. A document feeder as claimed in claim 1, wherein the second speed is lower than the first speed by about 2 to 20%.

3. A document feeder as claimed in claim 1, wherein the second speed is lower than the first speed by about 5 to 10%.

4. A document feeder as claimed in claim 1, wherein no other transporting means is provided between said separating/feeding means and said transporting means.

5. A document feeder comprising:
   a stacking section on which a plurality of documents of a maximum length are stacked;
   separating/feeding means for separating a document from the documents stacked on the stacking section and feeding the documents one by one;
   reading means for reading an image of a document at a specified position; and
   document transport path which is located between the separating/feeding means and the specified position, a portion of the document transport path which is longer than the maximum length in a document feeding direction does not include any transport or feeding means.

6. A document feeder as claimed in claim 5, further comprising:
   detecting means for detecting a length of a document in the document feeding direction; and
   setting means for setting a length of the document transport path in accordance with the length of the document detected by the detecting means.

7. A document feeder as claimed in claim 6, further comprising a moving system for moving the stacking section and the separating/feeding means in accordance with the length setting by the setting means.

8. A document feeder as claimed in claim 4, wherein a document transporting speed by the separating/feeding means is higher than that at the specified position.

9. A document feeder as claimed in claim 5, further comprising a transport roller pair for transporting a document while the document is at the specified position, wherein no other transporting means is provided between said separating/feeding means and said transport roller.

10. A document feeder as claimed in claim 5, wherein said document transport path is extendable.

11. A sheet-through type image reading apparatus comprising a document feeder as claimed in claim 5.

12. A document feeder comprising:
   a stacking section on which a plurality of documents are stacked;
   separating/feeding means for separating a document from the documents stacked on the stacking section and feeding the documents one by one;
   reading means for reading an image of a document at a specified position;
   detecting means for detecting a length of a document in a document feeding direction;
   document transport path which is located between the separating/feeding means and the specified position, the document transport path being capable of being switched to a plurality of routes of different length for a document; and
   control means for switching the route in accordance with the length of the document detected by the detecting means.

13. A document feeder comprising:
   a stacking section on which a plurality of documents are stacked;
   separating/feeding means for separating a document from the documents stacked on the stacking section and feeding the documents one by one;
   reading means for reading an image of a document at a specified position;
   transporting means for transporting a document upstream of the specified position, the transporting means includes a device for stopping a leading edge of the document and holding the document temporarily; and
   a document curving area where a trailing edge of the document held by the transporting means is curved while the document is held only by the transport means at the leading edge of the document.

14. A document feeder as claimed in claim 13, wherein a document transporting speed by the separating/feeding means is higher than that by the transporting means.

15. A document feeder as claimed in claim 13, wherein no other transporting means is provided between said separating/feeding means and said transporting means.

16. A method of document reading comprising the steps of:

feeding documents at a first speed;

separating one of the fed documents from a remainder of the documents with a separator;

detecting a length of the fed document in a document feeding direction;

guiding a leading edge of the one document to a specified position with a transport roller after a trailing edge of the one document passes the separator and while the one document is not being transported by a transporter or feeder; and reading an image of a document at the specified position.

17. A method of document reading as claimed in claim 16 further comprising the step of adjusting a distance between the separating/feeding section and the specified position in accordance with the detected length of the document in the document feeding direction.

18. A method of document reading as claimed in claim 16 further comprising the step of holding a leading edge of a document and curving said leading edge until a trailing edge of the document passes the separating/feeding section.

19. A method of document reading as claimed in claim 16, wherein said step of guiding the leading edge of the document to the specified position after a trailing edge of the document passes the separator includes guiding said document from said separator to said transport roller without passing the document through any other transporting means.

* * * * *

UNITED STATES PATENT AND TRADEMARK OFFICE
CERTIFICATE OF CORRECTION

PATENT NO. : 6,333,797 B1
DATED : December 25, 2001
INVENTOR(S) : Kunihiko Katsuta et al.

It is certified that error appears in the above-identified patent and that said Letters Patent is hereby corrected as shown below:

Column 16,
Line 13, please change "claim 4" to -- claim 5 --.

Signed and Sealed this

Twentieth Day of August, 2002

Attest:

Attesting Officer

JAMES E. ROGAN
Director of the United States Patent and Trademark Office